(12) United States Patent
Murakami et al.

(10) Patent No.: US 8,463,471 B2
(45) Date of Patent: Jun. 11, 2013

(54) DRIVING FORCE CONTROLLING APPARATUS FOR VEHICLE

(75) Inventors: Koji Murakami, Susono (JP); Hiroshi Sato, Susono (JP); Sachio Toyora, Numazu (JP); Makoto Taniguchi, Obu (JP); Masakazu Tago, Aisai (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 853 days.

(21) Appl. No.: 12/599,167

(22) PCT Filed: Apr. 24, 2008

(86) PCT No.: PCT/JP2008/057955
§ 371 (c)(1),
(2), (4) Date: Nov. 6, 2009

(87) PCT Pub. No.: WO2008/139885
PCT Pub. Date: Nov. 20, 2008

(65) Prior Publication Data
US 2010/0324764 A1 Dec. 23, 2010

(30) Foreign Application Priority Data
May 8, 2007 (JP) ................................. 2007-123730

(51) Int. Cl.
*B60W 10/08* (2006.01)
*B60W 20/00* (2006.01)
*B60W 10/04* (2006.01)

(52) U.S. Cl.
USPC ..................... 701/22; 180/65.21; 180/65.275; 180/65.285

(58) Field of Classification Search
USPC ......... 701/22, 99; 180/65.31, 65.285, 65.275, 180/65.1, 65.21; 903/906, 930; 318/140, 318/148, 141
See application file for complete search history.

(56) References Cited

U.S. PATENT DOCUMENTS

| | | | | |
|---|---|---|---|---|
| 6,563,230 B2 * | 5/2003 | Nada | ............................ | 290/40 C |
| 7,529,608 B2 * | 5/2009 | Shimizu | .......................... | 701/70 |
| 7,729,842 B2 * | 6/2010 | Sugita | .............................. | 701/84 |
| 8,020,651 B2 * | 9/2011 | Zillmer et al. | ........... | 180/65.285 |
| 2003/0042054 A1 * | 3/2003 | Matsubara et al. | .......... | 180/65.2 |
| 2005/0182532 A1 * | 8/2005 | Tobler et al. | ..................... | 701/22 |
| 2006/0138995 A1 * | 6/2006 | Sugita et al. | ................... | 318/811 |
| 2006/0235576 A1 * | 10/2006 | Matsuda | ........................... | 701/1 |

FOREIGN PATENT DOCUMENTS

| | | |
|---|---|---|
| JP | 62-138100 | 6/1987 |
| JP | 64-047298 | 2/1989 |
| JP | 2006-206040 A | 8/2006 |
| JP | 2006-296132 A | 10/2006 |
| JP | 2006-306144 A | 11/2006 |
| JP | 2006-315660 A | 11/2006 |

* cited by examiner

*Primary Examiner* — Christine Behncke
(74) *Attorney, Agent, or Firm* — Kenyon & Kenyon LLP

(57) ABSTRACT

A driving force controlling apparatus for a vehicle including an electric generator and a motor for driving a wheel other than a driving wheel, with electric power from the electric generator, includes a requested electric power computing means that computes requested electric power required for operation of the motor. Target output of the electric generator is set based on the requested electric power and maximum output that the electric generator can output stably. The driving force controlling apparatus for a vehicle including the motor for driving a wheel other than a driving wheel driven by an engine, with electric power from the electric generator, enables the electric generator to stably output electric power.

7 Claims, 23 Drawing Sheets

STABLE MAXIMUM OUTPUT Pmax

V-P CHARACTERISTIC

FIG.6

FORCES ACTING WHEN DEVIATION FROM
TARGET OUTPUT OCCURS

|   | DEVIATION | PHENOMENON | RESULT |
|---|---|---|---|
| a | $Pt > Palt$ (a1) | V RISES DUE TO LARGE POWER GENERATION AMOUNT | MOVE AWAY FROM a |
| a | $Palt > Pt$ (a2) | V DROPS DUE TO SMALL POWER GENERATION AMOUNT | MOVE AWAY FROM a |
| b | $Pt > Palt$ (b1) | V RISES DUE TO LARGE POWER GENERATION AMOUNT | APPROACH b |
| b | $Palt > Pt$ (b2) | V DROPS DUE TO SMALL POWER GENERATION AMOUNT | APPROACH b |

METHOD OF DETERMINING STABLE
LIMIT ELECTRIC POWER LINE SL

MAXIMUM EFFICIENCY LINE EL

REGION IN WHICH Pout CAN BE OUTPUT

INVERTER EFFICIENCY CHARACTERISTIC
(Nmot=const, Tmot=const)

OUTPUT TRANSITION DIAGRAM

DRIVING FORCE CONTROLLING APPARATUS FOR VEHICLE

This is a 371 national phase application of PCT/JP2008/057955 filed 24 Apr. 2008, claiming priority to Japanese Patent Application No. JP 2007-123730 filed 8 May 2007, the contents of which are incorporated herein by reference.

TECHNICAL FIELD

The present invention relates to a driving force controlling apparatus for a vehicle, and particularly to a driving force controlling apparatus for a vehicle including a motor for driving wheels other than driving wheels driven by an engine, with electric power from an electric generator.

BACKGROUND ART

A driving force controlling apparatus for a vehicle including a motor for driving wheels other than driving wheels driven by an engine, with electric power from an electric generator is known conventionally. In an AC motor electric 4WD including an AC motor existing on a non-engine shaft and driven by electric power from an alternator, a request is made of the alternator to generate electric power necessary for the motor. For this purpose, there is a demand for a technique for causing the alternator to stably output the requested voltage to enable the motor to operate stably.

Patent Document 1: Japanese Patent Application Laid-open No. 2006-206040
Patent Document 2: Japanese Patent Application Laid-open No. 2006-306144
Patent Document 3: Japanese Patent Application Laid-open No. 2006-296132
Patent Document 4: Japanese Patent Application Laid-open No. 2006-315660

DISCLOSURE OF INVENTION

Problem to be Solved by the Invention

As related art, there is a technique described in Japanese Patent Application Laid-open No. 2006-206040 (Patent Document 1), for example, but this technique has the following problems.

For example, if an upper limit voltage of the alternator is set at a predetermined value (42V in this example) as in a 42V alternator, for example, which is under consideration or employed in the motor vehicle industry, and if greater electric power than that the alternator can output stably is requested of the alternator, the alternator cannot stably output the electric power.

As shown in FIG. 23, there is a limit to electric power that the alternator can output stably depending on voltage (the output is stable at greater voltage than voltage at which a maximum value Pmax of electric power P is output in a V-P characteristic). If the voltage is increased, the electric power that can be output stably can be increased as well. However, if the upper limit voltage Vmax is determined and requested electric power is excessively large, it becomes impossible to output it stably. In conventional art, there is no concept of the upper limit voltage.

It is an object of the present invention to provide a driving force controlling apparatus for a vehicle including a motor for driving wheels other than driving wheels driven by an engine, with electric power from an electric generator, the driving force controlling apparatus for a vehicle enabling the electric generator to stably output electric power.

Means for Solving Problem

In order to solve the above mentioned problems and to achieve the object, a driving force controlling apparatus for a vehicle according to the present invention including an electric generator and a motor for driving a wheel other than a driving wheel, with electric power from the electric generator, the driving force controlling apparatus includes a requested electric power computing unit that computes requested electric power required for operation of the motor, wherein target output of the electric generator is set based on the requested electric power and maximum output that the electric generator is capable of outputting stably.

Further, in the driving force controlling apparatus for a vehicle, it is preferable that the stable maximum output of the electric generator is set based on an upper limit voltage of the electric generator.

Further, in the driving force controlling apparatus for a vehicle, it is preferable that the stable maximum output of the electric generator is set based on a stable output line obtained from maximum outputs at different internal electromotive voltages of the electric generator.

Further, in the driving force controlling apparatus for a vehicle, it is preferable that output of the electric generator is increased in such a manner as to move on an efficiency line set in advance in consideration of efficiency, when output of the electric generator is increased to the target output.

Further, in the driving force controlling apparatus for a vehicle, it is preferable that the efficiency line is set based on at least one of efficiency of the electric generator, efficiency of an inverter between the electric generator and the motor, and efficiency of the motor.

In the driving force controlling apparatus for a vehicle, it is preferable that output of the electric generator is increased in such a manner as to move on a stable output line obtained from maximum outputs at different internal electromotive voltages of the electric generator, when output of the electric generator is increased to the target output.

Effect of the Invention

With the driving force controlling apparatus for a vehicle according to the present invention, the driving force controlling apparatus for the vehicle including the motor for driving the wheels other than the driving wheels driven by the engine, with the electric power of the electric generator, can enable the electric generator to stably output electric power.

BRIEF DESCRIPTION OF DRAWINGS

FIG. 6 is a diagram for explaining forces acting when a deviation from a target output of the alternator occurs in the first embodiment of the driving force controlling apparatus for a vehicle in the present invention.

| EXPLANATIONS OF LETTERS OR NUMERALS | |
|---|---|
| 101 | engine |
| 102 | shaft |
| 103 | non-engine shaft |
| 104 | AC motor |
| 105 | belt |
| 106 | alternator |
| 107 | inverter |
| 108 | tire |
| 109 | means for changing a rotation ratio between the engine and tires |
| EL | maximum efficiency line |
| Pm | maximum value of output of the alternator |
| Pmax | stable maximum output |
| Pout | target alternator output |
| SL | Stable limit electric power line |
| Vmax | upper limit voltage |

BEST MODES FOR CARRYING OUT THE INVENTION

An embodiment of a driving force controlling apparatus for a vehicle in the present invention will be described below in detail with reference to the drawings.

First Embodiment

With reference to the accompanying drawings, a first embodiment will be described.

Figure 2:
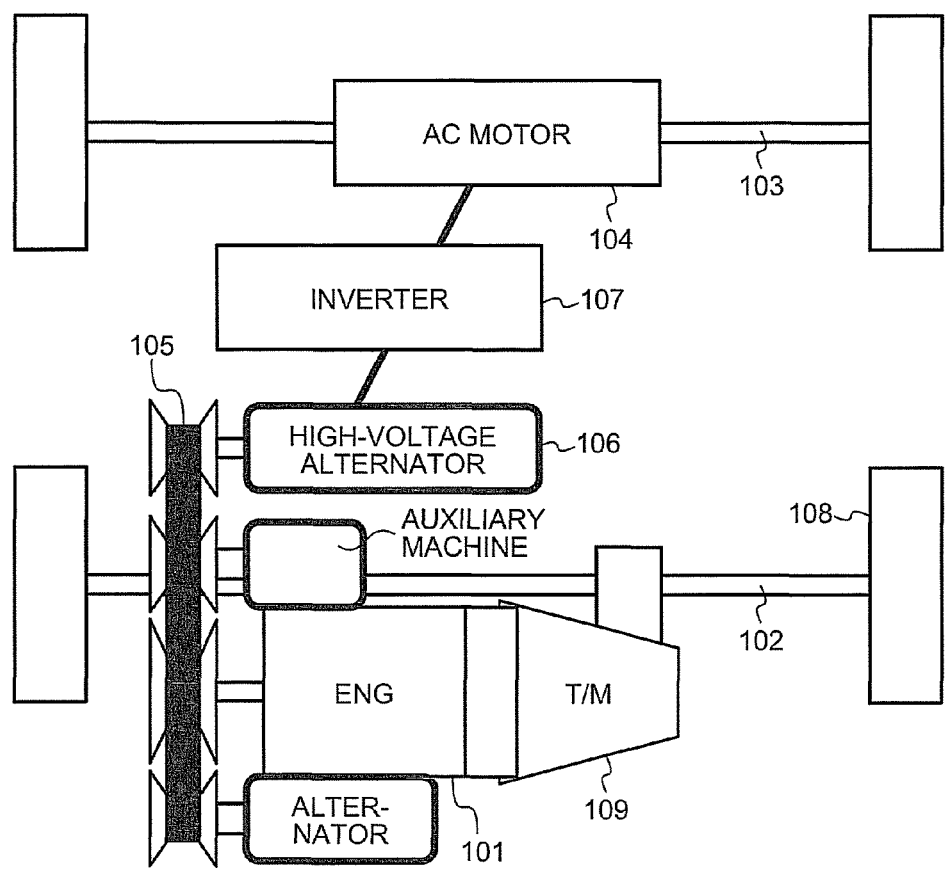
FIG. 2 is a schematic block diagram of the first embodiment of the driving force controlling apparatus for a vehicle in the present invention.
Figure 3:
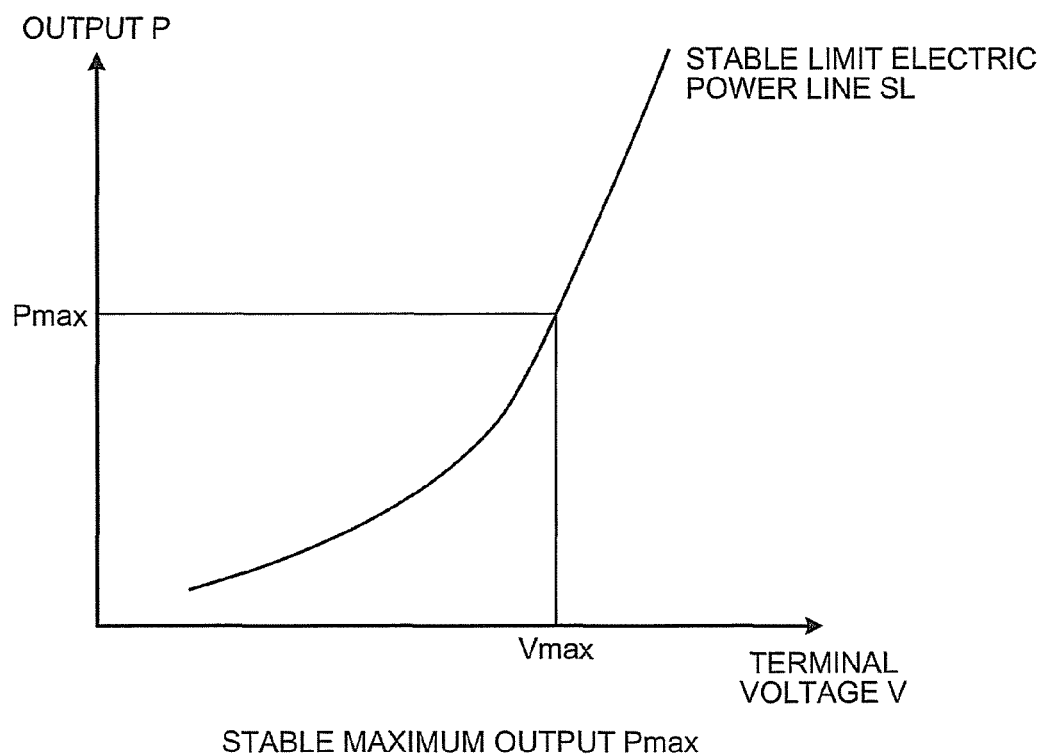
FIG. 3 is a diagram for explaining stable maximum output of the first embodiment of the driving force controlling apparatus for a vehicle in the present invention.

FIG. 2 depicts a schematic constitution of the present embodiment. The schematic constitution includes an AC motor 104 for driving a non-engine shaft 103 other than a shaft 102 driven by an engine 101, an alternator 106 connected to the engine 101 via a belt 105 to supply electric power to the AC motor 104, an inverter 107 for converting DC power generated by the alternator 106 into AC power, and means 109 for changing a rotation ratio between the engine 101 and tires 108 (irrespective of CVT, AT, or MMT).

The present embodiment relates to a method of controlling the alternator 106 in an AC motor electric 4WD including the AC motor 104 existing on the non-engine shaft 103 and driven with the electric power from the alternator 106.

There is a limit to the electric power that the alternator 106 can output stably depending on voltage. Therefore, if an upper limit voltage is determined and requested electric power is excessively large, it is impossible to output it stably. Therefore, if the requested electric power is excessively large, the alternator 106 outputs the maximum electric power that it can output stably and motor torque is suppressed according to the electric power.

For example, if the upper limit voltage Vmax is set at a predetermined value (42V in the embodiment) as in a 42V alternator, which is under consideration or employed in the motor vehicle industry, and if greater electric power Palt than the limit Pmax that the alternator 106 can output stably is requested of the alternator 106, the alternator 106 cannot stably output the electric power. It is an object of the embodiment to solve this problem.

Figure 1:
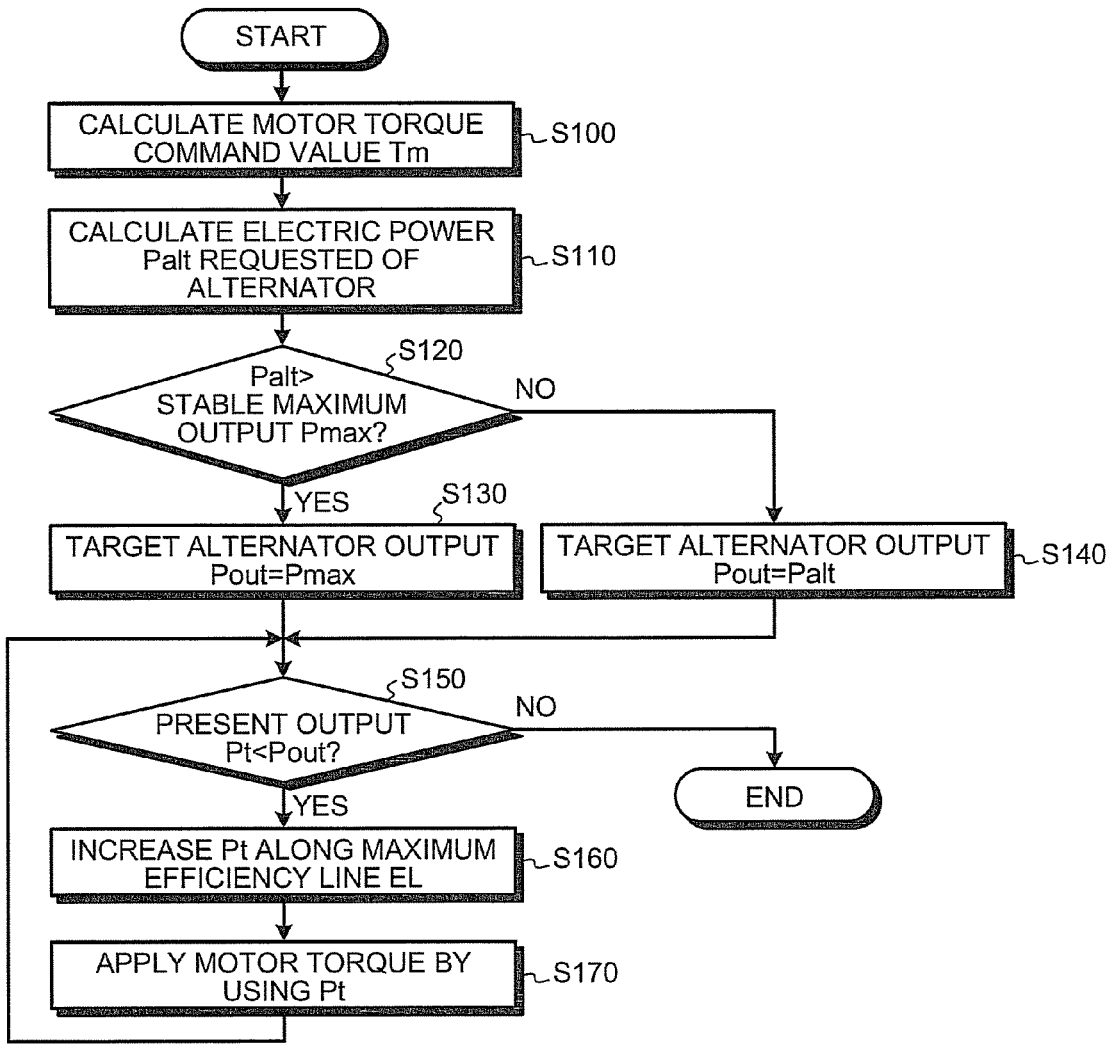
FIG. 1 is a flowchart illustrating an operation of a first embodiment of a driving force controlling apparatus for a vehicle in the present invention.

With reference to FIG. 1, operation of the first embodiment will be described.

[Step S100]

In step S100, a motor torque command value Tm representing torque that the motor 104 should output is calculated by using a preset map or the like according to a traveling condition of a vehicle.

[Step S110]

Next, in step S110, an electric power Palt requested of the alternator and representing electric power required to output the motor torque command value Tm is calculated. By using the motor torque command value Tm obtained in step S101, electric power used by the motor 104, and efficiency maps of the motor 104, the inverter 107, and the alternator 106, the electric power requested of the alternator 106 (the electric power Palt requested of the alternator) is obtained.

[Step S120]

Next, in step S120, whether or not the electric power Palt requested of the alternator is greater than a stable maximum output Pmax is determined. If the electric power Palt requested of the alternator is determined to be greater than the stable maximum output Pmax as a result of the determination, the control goes to step S130. If not, the control goes to step S140.

The stable maximum output Pmax is retained as a map in advance. The stable maximum output Pmax is electric power at an intersection point of a stable limit electric power line SL and an upper limit voltage Vmax. The stable limit electric power line SL is obtained as follows.

Figure 4:
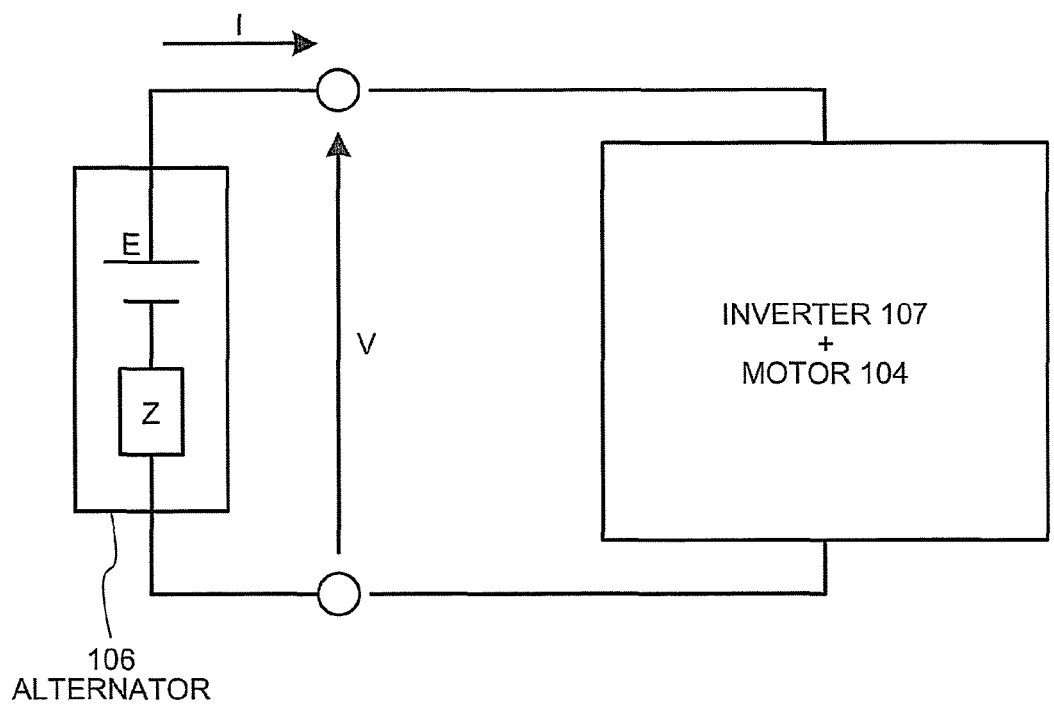
FIG. 4 is a diagram for explaining a method of obtaining a V-P characteristic of an alternator in the first embodiment of the driving force controlling apparatus for a vehicle in the present invention.

First, with reference to FIG. 4, a method of obtaining a V-P characteristic of the alternator 106 will be described. An output P of the alternator 106 will be obtained by means of the following expression (1).

[Expression 1]

$$P = \frac{E-V}{Z}V \quad (1)$$

Here, E is an internal electromotive voltage, V is a terminal voltage, and Z is an internal impedance.

The internal electromotive voltage E is expressed by the following expression (2).

[Expression 2]

$$E = n * \frac{d\varphi}{dt} \quad (2)$$
$$\propto n * If * Nalt$$

Here, n is the number of stator turns, φ is magnetic flux, If is an excitation current, and Nalt is a rotational speed of the alternator 106.

Figure 5:
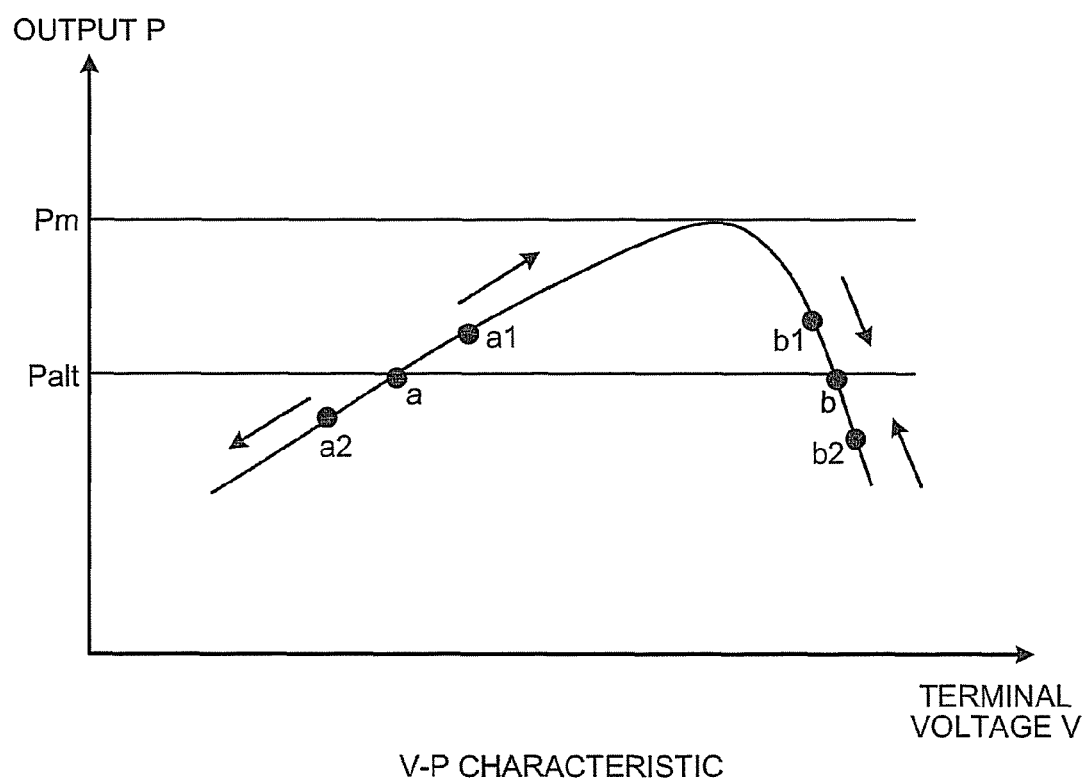
FIG. 5 is another diagram for explaining a method of obtaining the V-P characteristic of the alternator in the first embodiment of the driving force controlling apparatus for a vehicle in the present invention.

First, stability will be described by using FIG. 5 illustrating the V-P characteristic of the alternator 106. To output the electric power Palt requested of the alternator, the alternator 106 is operated at a point "a" or a point "b".

With reference to FIGS. 5 and 6, operation around the point a will be discussed. When a present power generation amount Pt of the alternator 106 becomes greater than the electric power Palt requested of the alternator 106 at the point a (point a1), electric power consumed by the motor is constant and therefore voltage of the alternator 106 rises (if the amount of power generation increases, the voltage rises to store surplus energy in a capacitor). As a result, the power generation amount Pt deviates from the point a.

On the other hand, when the present power generation amount Pt of the alternator 106 becomes smaller than the electric power Palt requested of the alternator 106 (point a2), the voltage drops. As a result, the power generation amount Pt deviates from the point a. Therefore, with a minute change at the point a, it becomes impossible to output the electric power Palt requested of the alternator and the output becomes unstable.

Next, operation around the point b will be discussed. When a present power generation amount Pt of the alternator 106 becomes greater than the electric power Palt requested of the alternator 106 at the point b (point b1), electric power consumed by the motor 104 is constant and therefore voltage of the alternator 106 rises. As a result, the power generation amount Pt approaches the point b.

On the other hand, when the present power generation amount Pt of the alternator 106 becomes smaller than the electric power Palt requested of the alternator 106 (point b2), the voltage drops. As a result, the power generation amount Pt approaches the point b. Therefore, even if a minute change occurs around the point b, such a force as to bring the power generation amount Pt close to the point b acts and therefore it becomes possible to output the electric power Palt requested of the alternator and the output becomes stable.

For this reason, if the voltage is greater than voltage at which the output P of the alternator 106 becomes the maximum value Pm, the output becomes stable.

Figure 7:
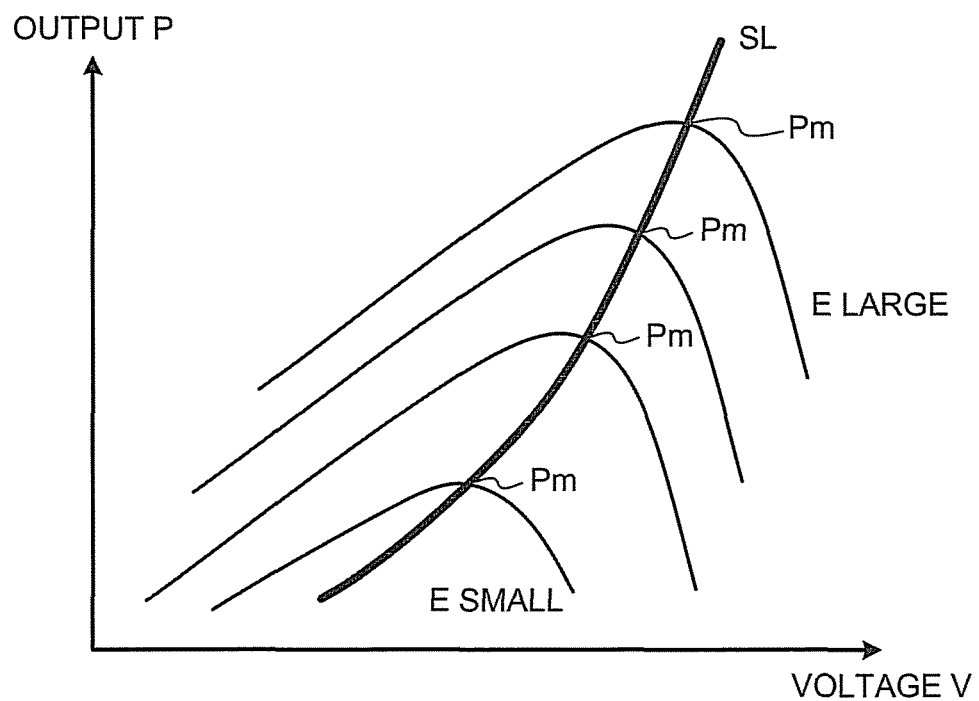
FIG. 7 is a diagram for explaining a method of determining a stable limit electric power line in the first embodiment of the driving force controlling apparatus for a vehicle in the present invention.

Therefore, as shown in FIG. 7, the stable limit electric power line SL is obtained by changing a value of the internal electromotive force E and connecting the respective maximum values Pm of the output P of the alternator 106. If the voltage is greater than the stable limit electric power line SL, it is possible to stably output the requested electric power.

Although the line connecting the maximum values Pm of the output P of the alternator 106 is defined as the stable electric power limit line, it is also possible to set a margin to make allowance.

Figure 8:
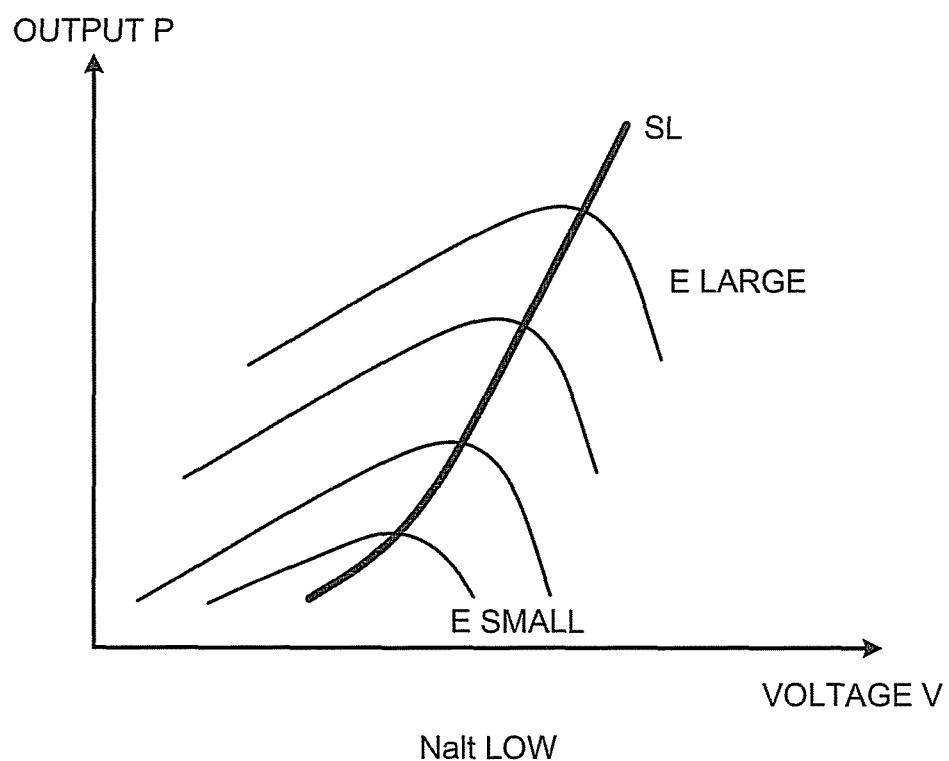
FIG. 8 is a diagram for explaining a difference in the stable limit electric power line due to a difference in rotational speed of the alternator in the first embodiment of the driving force controlling apparatus for a vehicle in the present invention.
Figure 9:
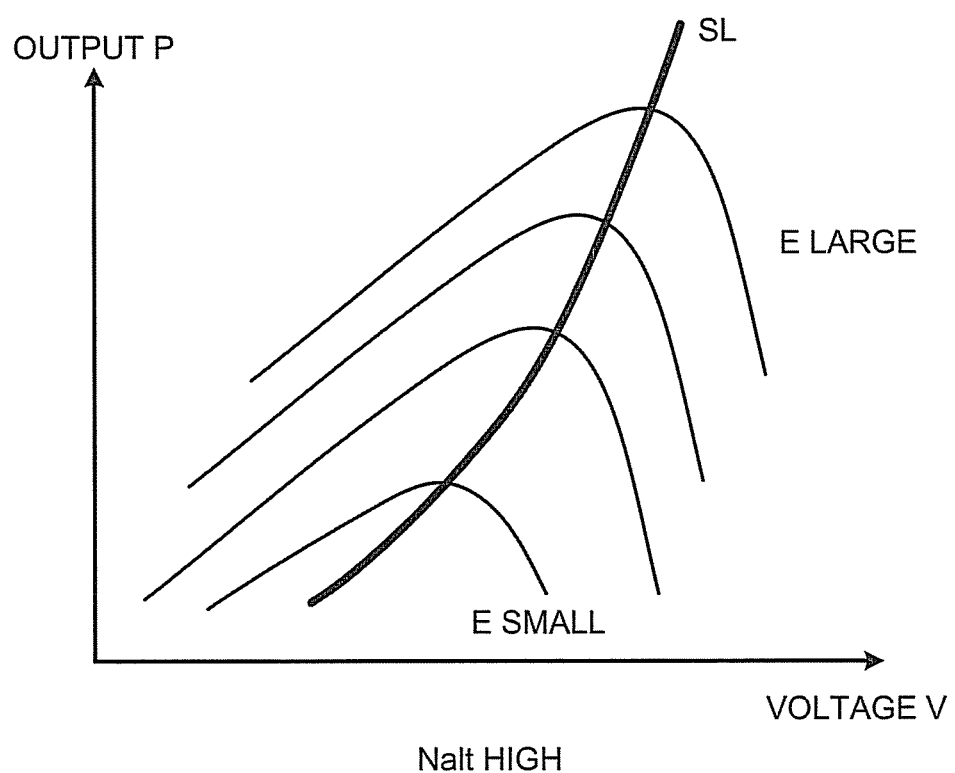
FIG. 9 is another diagram for explaining a difference in the stable limit electric power line due to a difference in the rotational speed of the alternator in the first embodiment of the driving force controlling apparatus for a vehicle in the present invention.

Because the V-P characteristic shown in FIG. 5 is given to every rotational speed Nalt of the alternator 106, the stable limit electric power line SL and the stable maximum output Pmax are also stored for each rotational speed Nalt of the alternator 106 (See FIGS. 8 and 9. Nalt is low in FIG. 8 and high in FIG. 9). Therefore, the stable maximum output Pmax is stored in a map together with the rotational speed Nalt of the alternator 106. Accordingly, in step S120, the rotational speed Nalt of the alternator 106 is detected, and the Pmax is obtained from the map and compared with the Palt.

[Step S130]

In step S130, a target alternator output Pout is set at the stable maximum output Pmax.

If the electric power Palt requested of the alternator is greater than the stable maximum output Pmax (step S120—Y), the electric power greater than the maximum electric power (stable maximum output Pmax) that the alternator 106 can output stably is requested. In this case, the target alternator output Pout is set at the stable maximum output Pmax so that the alternator 106 can output stably. Following step S130, the control goes to step S150.

[Step S140]

In step S140, the target alternator output Pout is set at the electric power Palt requested of the alternator. If the electric power Palt requested of the alternator is equal to or smaller than the stable maximum output Pmax (step S120—N), the electric power requested of the alternator 106 (the electric power Palt requested of the alternator) is in such a range that the alternator 106 can output it stably. In this case, the target alternator output Pout is set at the electric power Palt requested of the alternator. Following step S140, the control goes to step S150.

[Step S150]

In step S150, the present output Pt of the alternator 106 and the target alternator output Pout are compared with each other to determine whether or not an end condition of this control is satisfied. Whether or not the present output Pt of the alternator 106 is smaller than the target alternator output Pout is determined. If the present output Pt of the alternator 106 is smaller than the target alternator output Pout as a result of the determination, the control goes to step S160. If not, this control ends.

[Step S160]

In step S160, the present output Pt of the alternator 106 is increased to move on a maximum efficiency line EL.

If the present output Pt of the alternator 106 is smaller than the target alternator output Pout (step S150—Y), the inverter 107 requests the alternator 106 to increase the present output Pt of the alternator 106. At this time, the present output Pt of the alternator 106 is increased while controlling the excitation current to control the voltage so that the output moves on the maximum efficiency line EL obtained in advance.

A method of obtaining the maximum efficiency line EL (the most efficient course considering collectively from the alternator 106 to the motor 104) when the rotational speed Nalt of the alternator 106, a rotational speed Nmot of the motor 104, torque Tmot of the motor 104 are fixed will be shown below.

Total efficiency η is obtained by multiplying efficiency ηalt of the alternator 106 by efficiency ηinv of the inverter 107 and efficiency ηmot of the motor 104 (the following expression 3).

[Expression 3]

$$\eta = \eta_{alt} * \eta_{inv} * \eta_{mot} \qquad (3)$$

Figure 10:
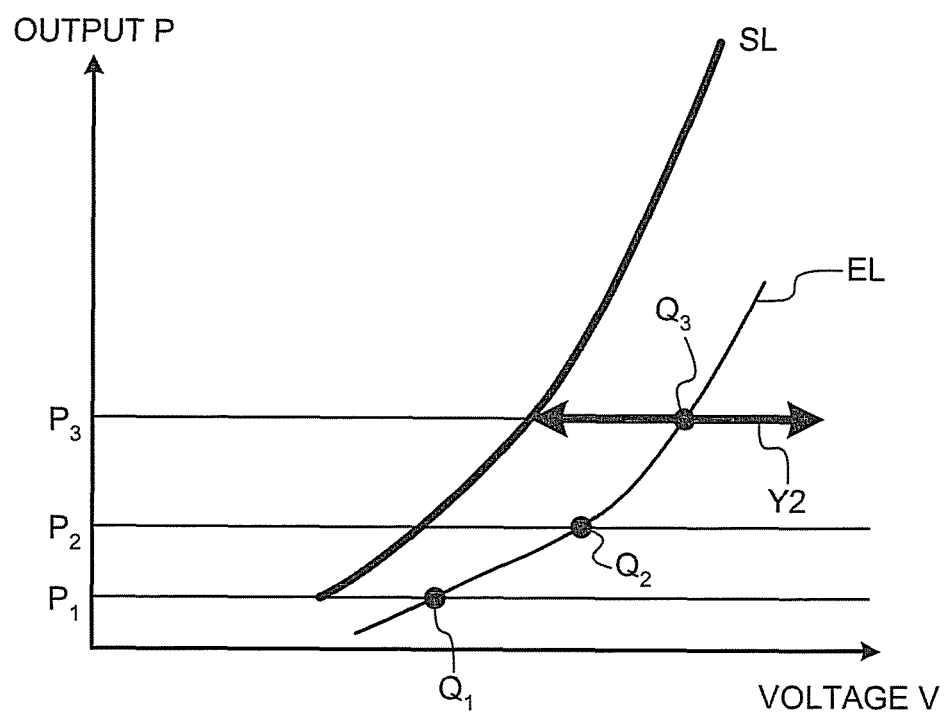
FIG. 10 is a diagram for explaining a maximum efficiency line in the first embodiment of the driving force controlling apparatus for a vehicle in the present invention.
Figure 11:
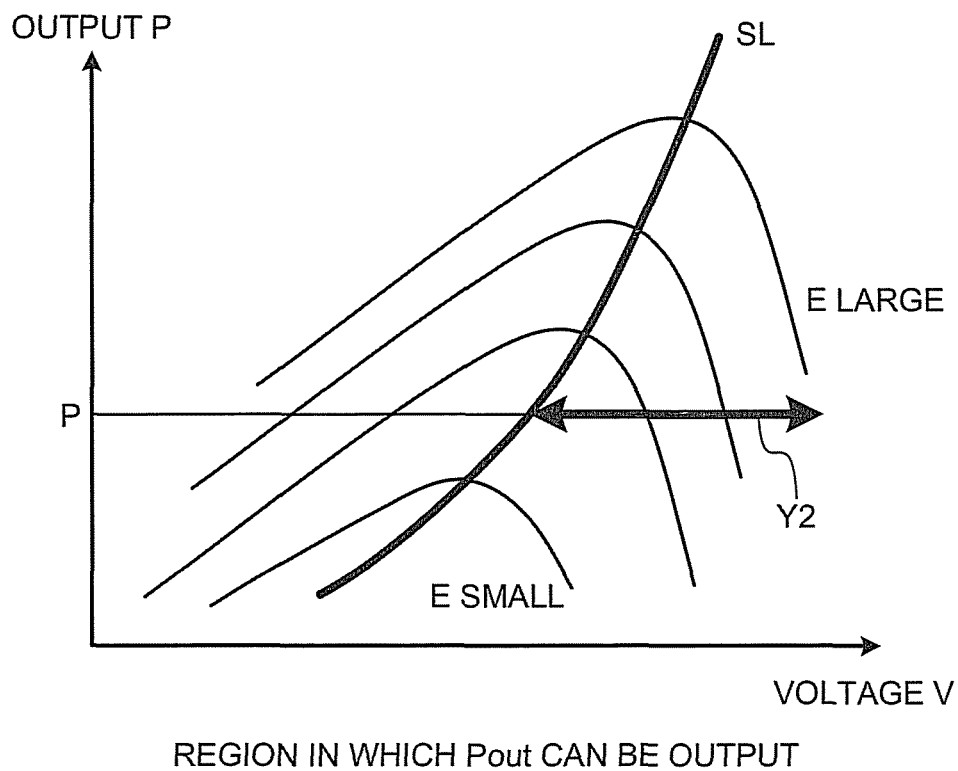
FIG. 11 is a diagram for explaining a region in which a target alternator output can be output in the first embodiment of the driving force controlling apparatus for a vehicle in the present invention.

When the target alternator output Pout is determined, the range in which the target alternator output Pout can be output stably is a portion shown with an arrow Y2 in FIGS. 10 and 11 (the range in which the voltage is higher than the stable limit electric power line SL).

As shown in FIG. 10, the output electric power P of the alternator 106 is changed ($P_1, P_2, P_3 \ldots$) and points Q ($Q_1, Q_2, Q_3, \ldots$) with the maximum total efficiency η the ranges Y2 in which the target alternator output Pout can be output stably for the respective values of the output electric power P ($P_1, P_2, P_3 \ldots$) of the alternator 106 are connected to thereby obtain the maximum efficiency line EL.

Although the maximum efficiency line EL is obtained based on the total efficiency η that is the product of the efficiency ηalt of the alternator 106, the efficiency ηinv of the inverter 107, and the efficiency ηmot of the motor 104 in the embodiment, the maximum efficiency line EL can be obtained based on at least one of the efficiency ηalt of the alternator 106, the efficiency ηinv of the inverter 107, and the efficiency ηmot of the motor 104 or based on the product of two of them.

Figure 12:
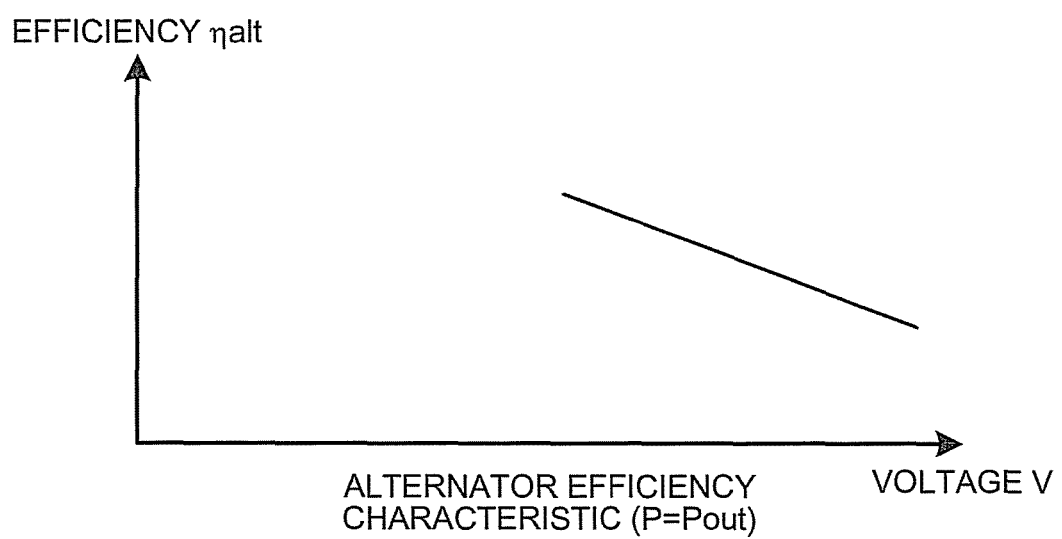
FIG. 12 is a diagram illustrating an efficiency characteristic of the alternator in the first embodiment of the driving force controlling apparatus for a vehicle in the present invention.

The alternator 106 in an example of the embodiment will be discussed. FIG. 12 shows a V-ηalt characteristic in the range Y2 in which the alternator 106 in the example can stably output the target alternator output Pout. In this range, the smaller the internal electromotive voltage E is, i.e., the lower the voltage V is, the higher the efficiency becomes.

Figure 13:
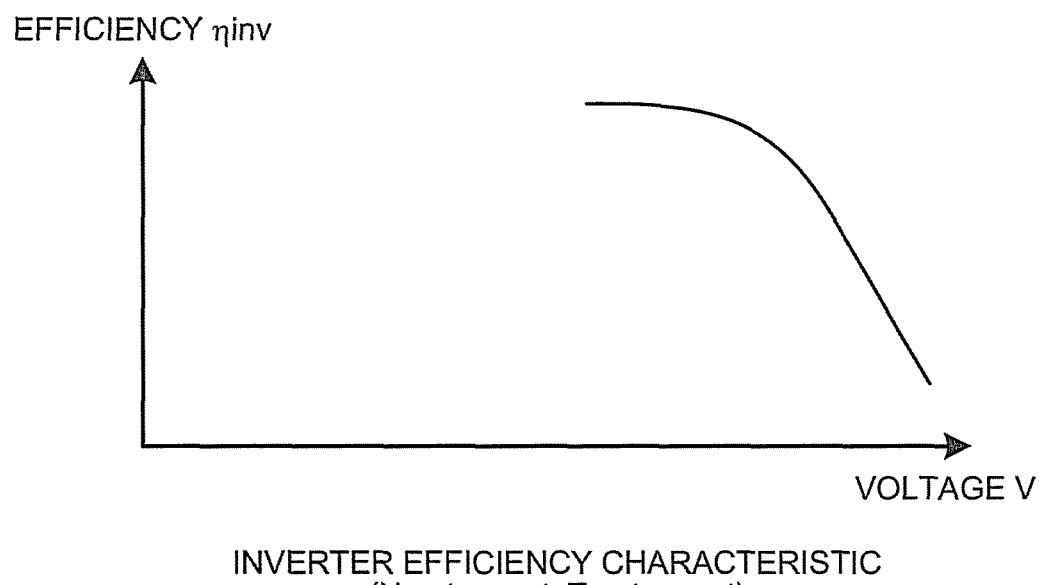
FIG. 13 is a diagram illustrating an efficiency characteristic of an inverter in the first embodiment of the driving force controlling apparatus for a vehicle in the present invention.

The inverter 107 in an example of the embodiment will be discussed. FIG. 13 shows a V-ηmot characteristic of the inverter 107 when the rotational speed and torque of the motor 104 are fixed. The lower the voltage is, the higher the efficiency of the inverter 107 becomes.

Figure 14:
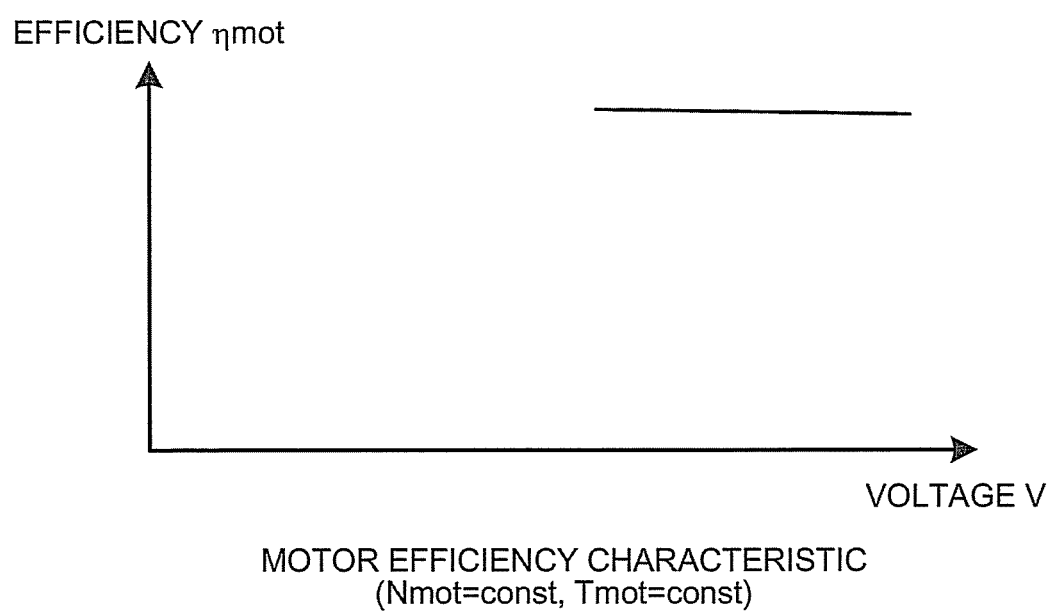
FIG. 14 is a diagram illustrating an efficiency characteristic of a motor in the first embodiment of the driving force controlling apparatus for a vehicle in the present invention.

The motor 104 in an example of the embodiment will be discussed. FIG. 14 shows a V-ηmot characteristic of the motor 104 when the rotational speed and torque of the motor 104 are fixed. The efficiency of the motor 104 hardly depends on the voltage.

Figure 15:
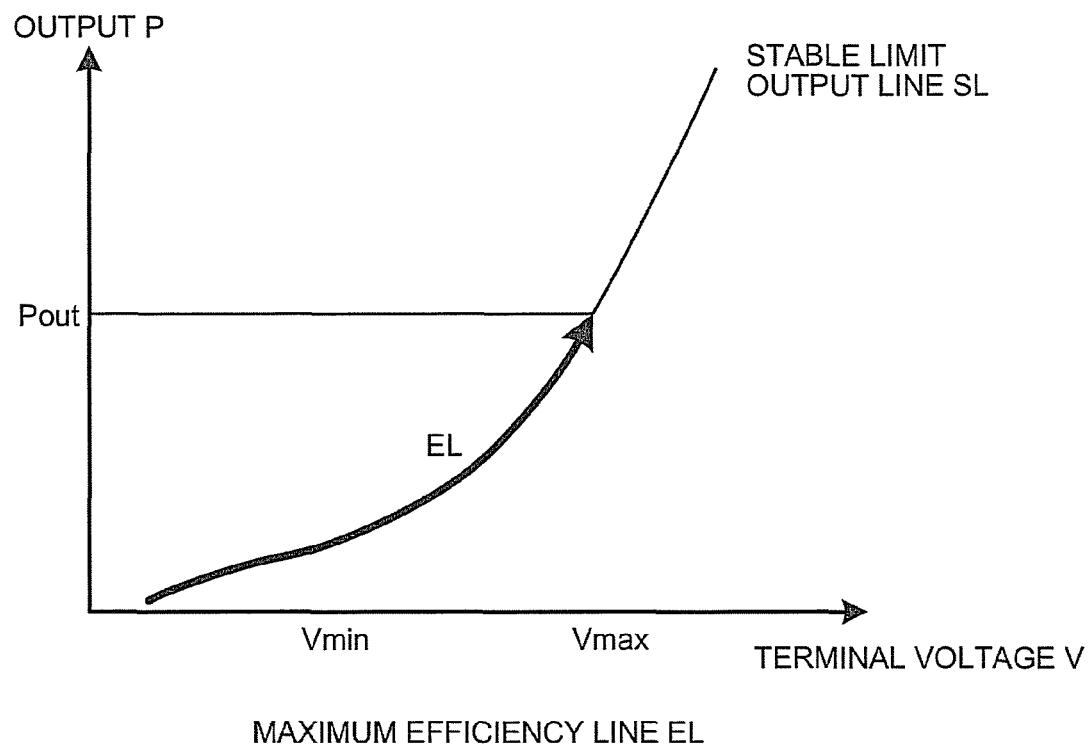
FIG. 15 is another diagram for explaining the maximum efficiency line in the first embodiment of the driving force controlling apparatus for a vehicle in the present invention.

Consequently, in the example of the embodiment, the lower the voltage is, the higher the total efficiency η becomes. Therefore, the maximum efficiency line EL coincides with the stable limit electric power line SL as shown in FIG. 15.

However, different alternators 106, inverters 107, and motors 104 have different efficiency characteristics. Thus, if the total efficiency has a monotone trend, it is necessary to form a map in advance where the efficiency ηalt of the alternator 106, the efficiency ηmot of the motor 104, and the torque Tmot of the motor 104 are arguments and voltages that provide the maximum efficiency are return values and obtain the maximum efficiency line EL based on the map.

[Step S170]

Next, in step S170, the motor torque is applied by using the present output Pt of the alternator 106. By using the present output Pt of the alternator 106, the AC motor 104 is driven and the torque is applied. Following step S170, the control returns to step S150. Thereafter, by repeating the operations in steps S150 to S170, motor torque according to the motor torque command value is output.

The present embodiment relates to the method of controlling the alternator 106 in the AC motor electric 4WD including the AC motor 104 existing on the non-engine shaft and driven with the electric power from the alternator 106. There is the limit Pmax to the electric power that the alternator 106 can output stably depending on voltage. Therefore, if the upper limit voltage Vmax is determined and requested electric power Palt is excessively large, it is impossible to output it stably. Therefore, if the electric power Palt requested of the alternator is excessively large (step S120—Y), the alternator 106 outputs the maximum electric power Pmax (Pout=Pmax) that it can output stably and the motor torque is suppressed according to the electric power. In the present embodiment, the stability (step S120), the requested electric power (step S140), and the efficiency (step S160) are weighted in this order in controlling the alternator 106. In contrast to constant voltage control for increasing the output while keeping the terminal voltage V constant as control of the alternator in conventional art, the efficiency is taken into consideration in the present embodiment.

Second Embodiment

Next, with reference to FIGS. 16 to 18, a second embodiment will be described.

In the second embodiment, portions common to the first embodiment will be provided with the same reference numerals and detailed description thereof will be omitted.

In the first embodiment, the present output Pt is increased to move on the maximum efficiency line EL (step S150 in FIG. 1). In the second embodiment, on the other hand, control is carried out while keeping target voltage Vout constant in consideration of ease of control in increasing the present output Pt.

[Step S131]

Figure 16:
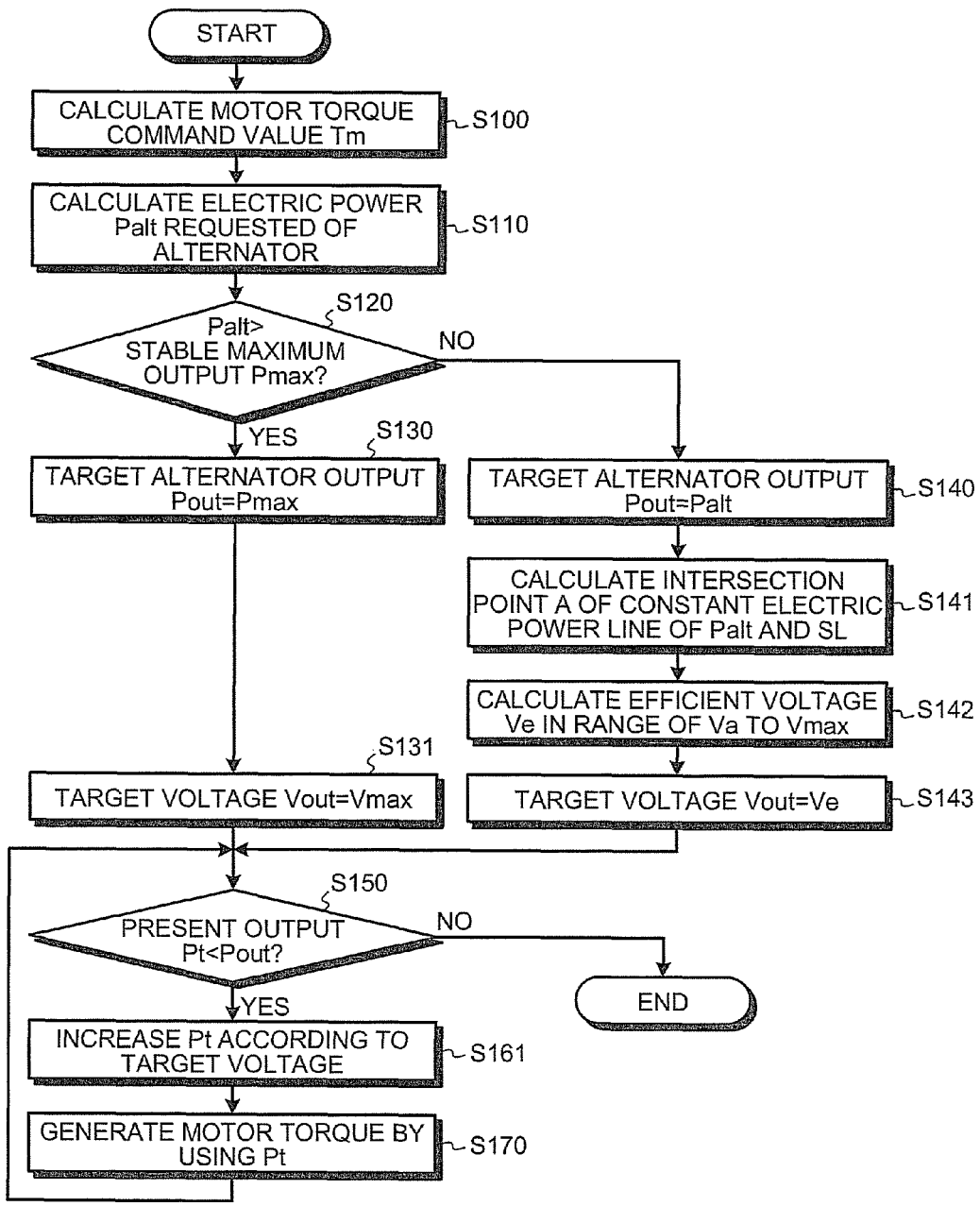
FIG. 16 is a flowchart for explaining operation of a second embodiment of the driving force controlling apparatus for a vehicle in the present invention.

As shown in FIG. 16, in step S130 similar to that in the first embodiment, the target alternator output Pout is set at the stable maximum output Pmax. Then, in step S131, the target voltage Vout is set at the upper limit voltage Vmax (see FIG. 17). Following step S131, the control goes to step S150.

[Step S141]

In step S140 similar to that in the first embodiment, the target alternator output Pout is set at the electric power Palt requested of the alternator. Then, in step S141, an intersection point A of a constant electric power line of the electric power Palt requested of the alternator and the stable limit electric power line SL is calculated as shown in FIG. 18.

[Step S142]

Figure 18:
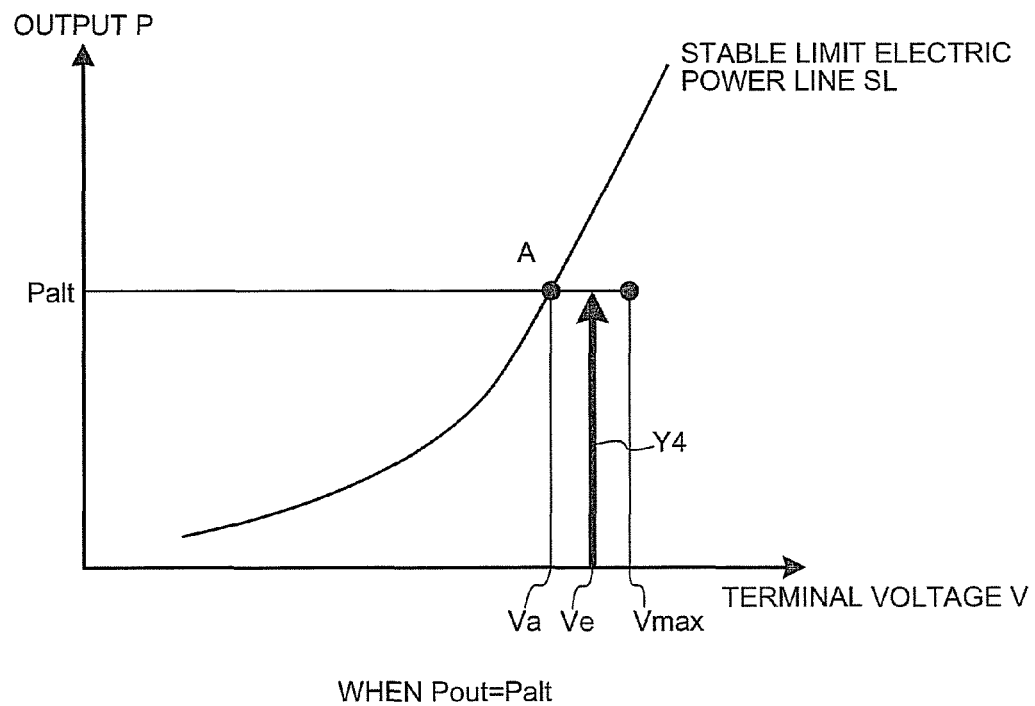
FIG. 18 is a diagram for explaining operation when the target alternator output is equal to electric power requested of the alternator in the second embodiment of the driving force controlling apparatus for a vehicle in the present invention.

Next, in step S142, the efficient voltage Ve in a range from voltage Va corresponding to the intersection point A obtained in step S141 to the upper limit voltage Vmax is calculated (see FIG. 18). The most efficient voltage Ve is selected considering collectively from the alternator 106 to the motor 104.

[Step S143]

Next, in step S143, the target voltage Vout is set at the voltage Ve (see FIG. 18). Because the output is stable at any voltage between the voltage Va and the upper limit voltage Vmax, the target voltage Vout may be set at the voltage Va or at the voltage Vmax to omit calculation of efficiency. Following step S143, the control goes to step S150.

[Step S150]

In step S150, similarly to the first embodiment, whether or not the present output Pt is smaller than the target alternator output Pout is determined. If the present output Pt is smaller than the target alternator output Pout as a result of determination, the control goes to step S161. If not, the control ends.

[Step S161]

Figure 17:
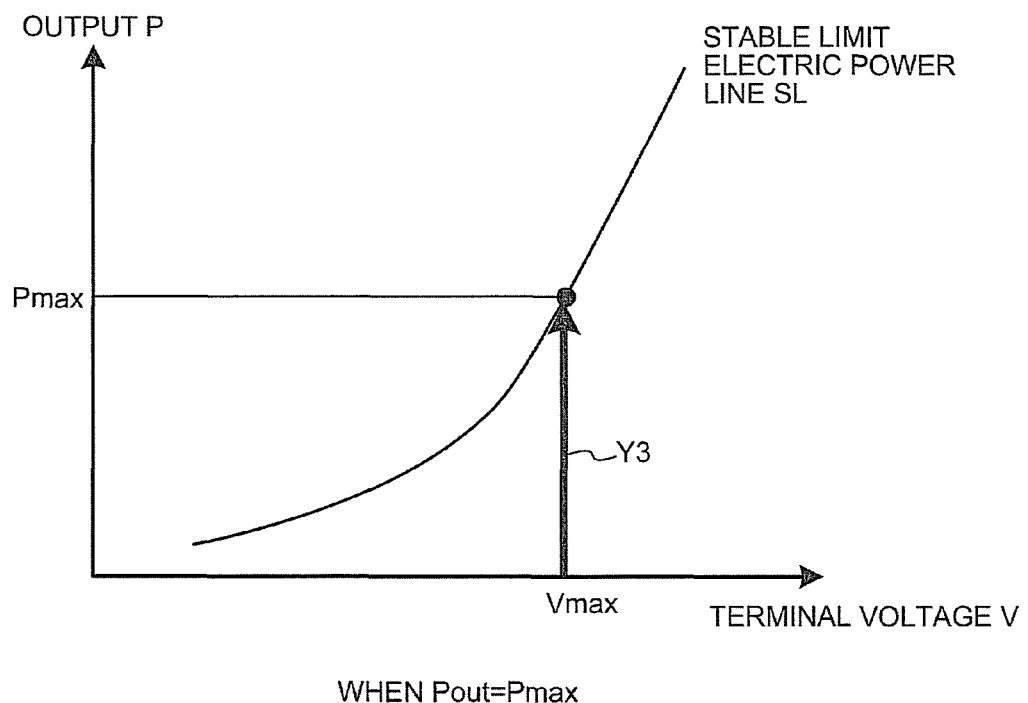
FIG. 17 is a diagram for explaining operation when a target alternator output is equal to a stable maximum output in the second embodiment of the driving force controlling apparatus for a vehicle in the present invention.

In step S161, the present output Pt is increased while controlling an excitation current and keeping the target voltage Vout constant (see arrows Y3, Y4 in FIGS. 17, 18).

[Step S170]

In step S170, similarly to the first embodiment, motor torque is generated by using the present output Pt. After step S170, steps from S150 to S170 are repeated until the result of the determination in step S150 becomes negative.

Third Embodiment

Next, with reference to FIGS. 19 and 20, a third embodiment will be described.

In the third embodiment, portions common to the above embodiments will be provided with the same reference numerals and detailed description thereof will be omitted.

In the first embodiment, the target alternator output Pout is determined based on the result of comparison between the electric power Palt requested of the alternator and the stable maximum output Pmax (step S120, step S130, step S140). Instead, in the third embodiment, the target alternator output Pout can be determined by the upper limit voltage Vmax. This is because the upper limit voltage Vmax and the stable maximum output Pmax are in such a relationship that one of them determines the other based on the V-P characteristic.

[Step S111]

Figure 19:
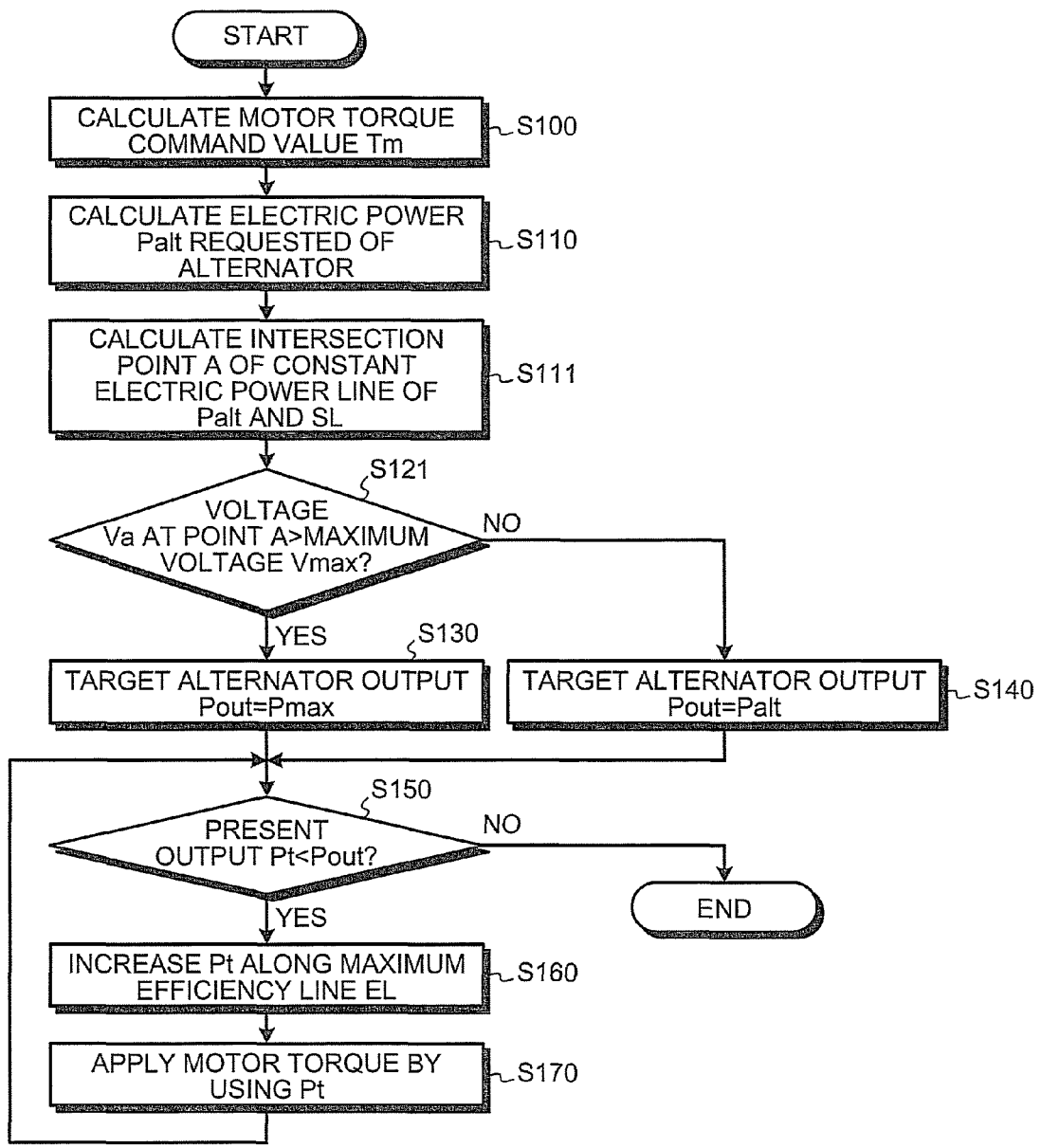
FIG. 19 is a flowchart illustrating operation of a third embodiment of the driving force controlling apparatus for a vehicle in the present invention.
Figure 20:
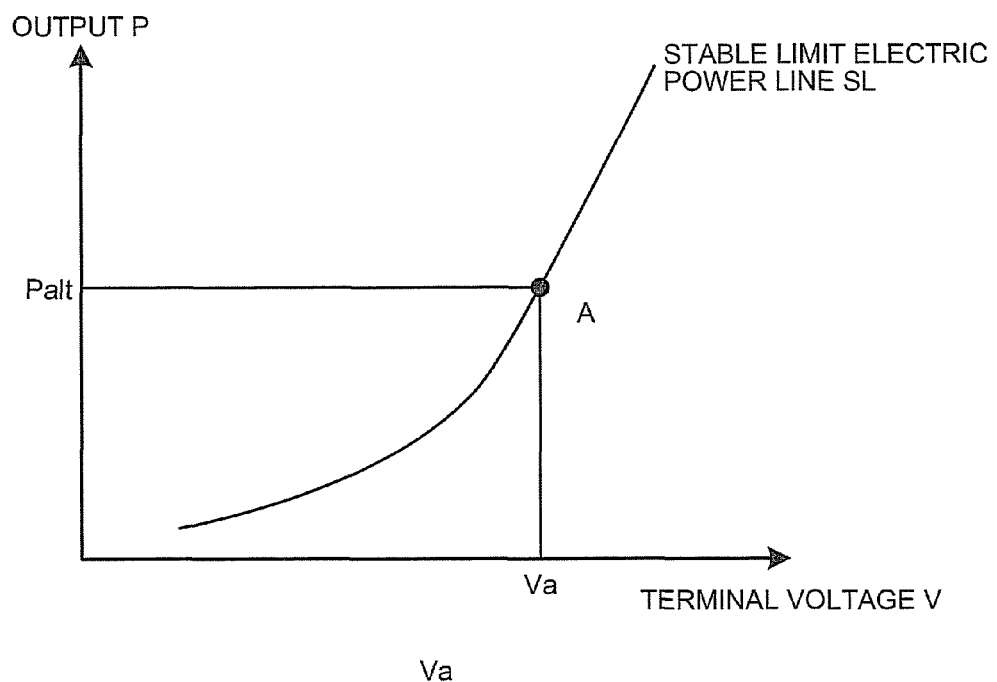
FIG. 20 is a diagram for explaining the operation of the third embodiment of the driving force controlling apparatus for a vehicle in the present invention.

In step S111 in FIG. 19, an intersection point A of a constant electric power line of the electric power Palt requested of the alternator calculated in step S110 and the stable limit electric power line SL is obtained as shown in FIG. 20.

[Step S121]

Next, in step S121, whether or not the upper limit voltage Vmax is higher than voltage Va at the point A obtained in step S111 is determined. If the upper limit voltage Vmax is determined to be higher than the voltage Va as a result of the determination, the target alternator output Pout is set at the stable maximum output Pmax in step S130. If not, the target alternator output Pout is set at the electric power Palt requested of the alternator in step S140.

As described above, in step S121, comparison with the voltage instead of comparison with the electric power is possible.

Fourth Embodiment

Figure 21:
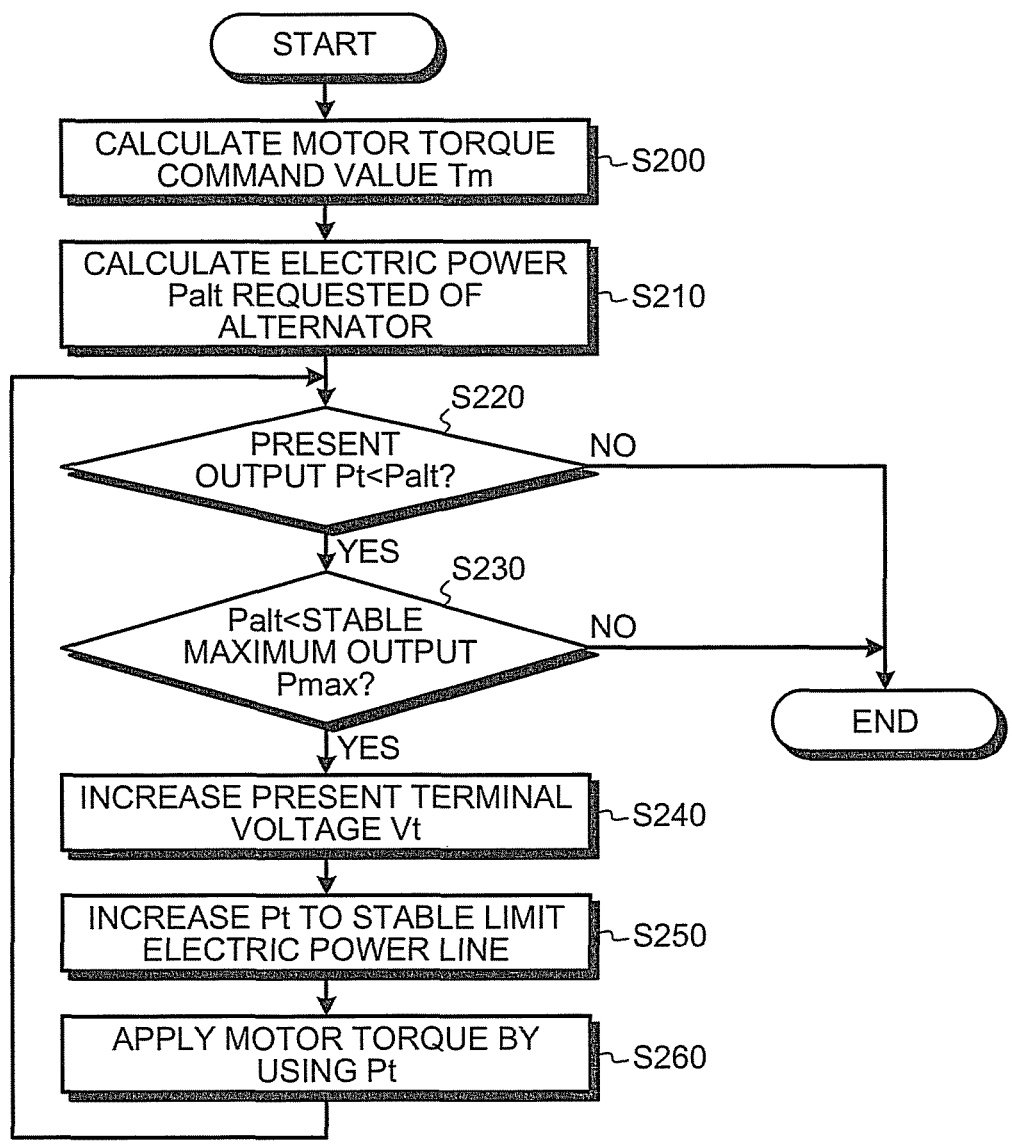
FIG. 21 is a flowchart illustrating operation of a fourth embodiment of the driving force controlling apparatus for a vehicle in the present invention.
Figure 22:
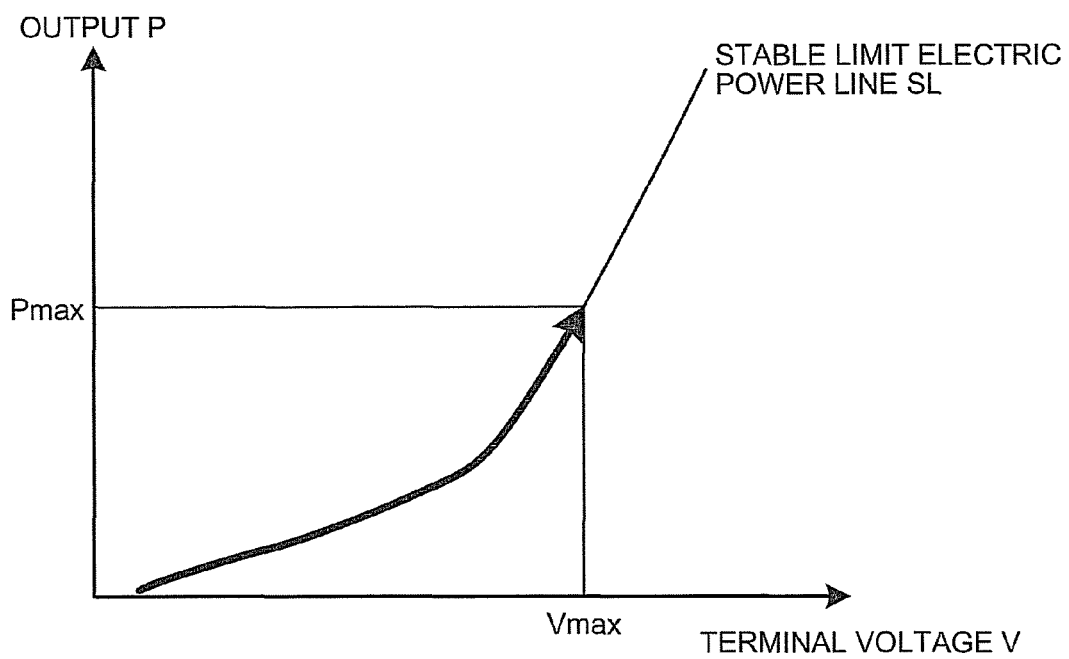
FIG. 22 is a diagram for explaining the operation of the fourth embodiment of the driving force controlling apparatus for a vehicle in the present invention.
Figure 23:
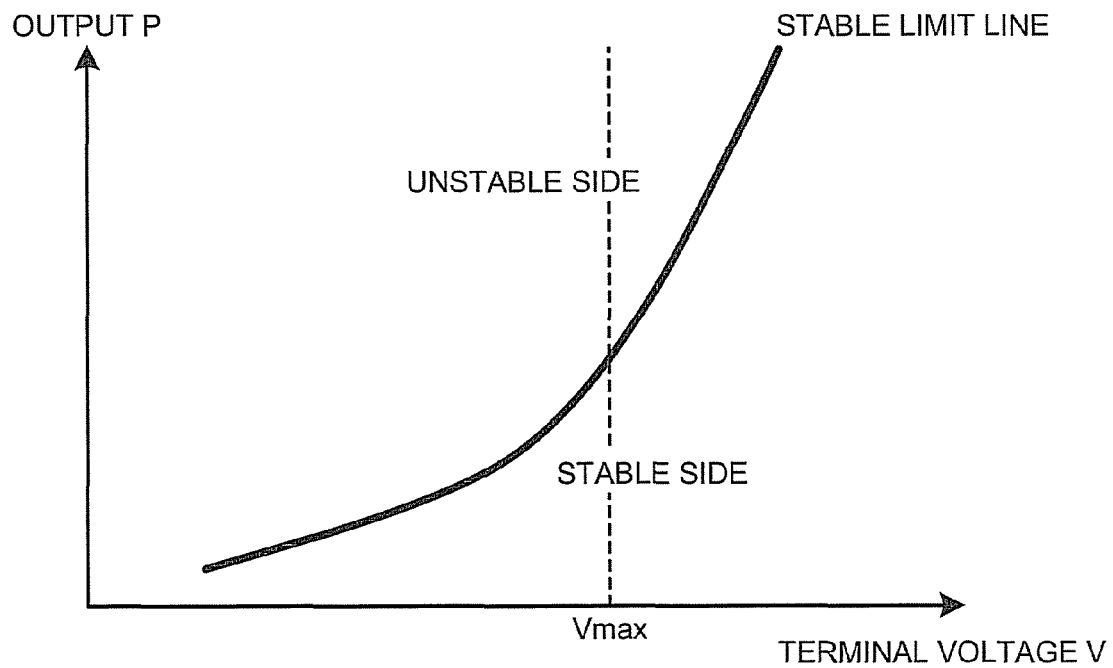
FIG. 23 is a diagram for explaining problems in conventional art.

Next, with reference to FIGS. 21 and 22, a fourth embodiment will be described.

In the fourth embodiment, detailed description of portions common to the above embodiments will be omitted.

In the fourth embodiment, the method of increasing the present output Pt of the alternator 106 is different. The present output Pt is increased along the maximum efficiency line EL in the first embodiment and the present output Pt is increased while keeping the voltage constant in the second embodiment. In the fourth embodiment, the present output Pt is increased to the stable maximum output Pmax along the stable limit electric power line SL (see steps S230 to S250 in FIG. 21, FIG. 22).

If the present output Pt is smaller than the electric power Palt requested of the alternator (step S220-Y), whether or not the present output Pt is smaller than the stable maximum output Pmax is determined (step S230). If the present output Pt is smaller than the stable maximum output Pmax (step S230-Y) as a result of the determination, the present terminal voltage Vt is increased (step S240). Next, the present output Pt is increased to the stable limit electric power line SL (step S250). Then, by using the present output Pt, motor torque is applied (step S260).

In step S240, an increase in the present terminal voltage Vt may be a constant minute amount or may be changed according to a value obtained by subtracting the present output Pt from the smaller one of the electric power Palt requested of the alternator and the stable maximum output Pmax (MIN (Palt, Pmax)−Pt).

INDUSTRIAL APPLICABILITY

As described above, the driving force controlling apparatus for a vehicle according to the present invention is useful to a driving force controlling apparatus for a vehicle including a motor for driving wheels other than driving wheels driven by an engine, with electric power from an electric generator, and is especially suitable for stably outputting the electric power from the electric generator.

The invention claimed is:

1. A driving force controlling apparatus for a vehicle including an electric generator and a motor for driving a wheel other than a driving wheel, with electric power from the electric generator, the driving force controlling apparatus comprising:

a requested electric power computing unit that computes requested electric power required for operation of the motor, wherein target output of the electric generator is set based on the requested electric power and maximum output that the electric generator is capable of outputting stably;

wherein the stable maximum output of the electric generator is set based on a stable output line obtained from maximum outputs at different internal electromotive voltages of the electric generator.

2. A driving force controlling apparatus for a vehicle according to claim 1, wherein the stable maximum output of the electric generator is set based on an upper limit voltage of the electric generator.

3. A driving force controlling apparatus for a vehicle according to claim 2, wherein output of the electric generator is increased in such a manner as to move on an efficiency line set in advance in consideration of efficiency, when output of the electric generator is increased to the target output.

4. A driving force controlling apparatus for a vehicle according to claim 3, wherein the efficiency line is set based on at least one of efficiency of the electric generator, efficiency of an inverter between the electric generator and the motor, and efficiency of the motor.

5. A driving force controlling apparatus for a vehicle according to claim 1, wherein output of the electric generator is increased in such a manner as to move on an efficiency line set in advance in consideration of efficiency, when output of the electric generator is increased to the target output.

6. A driving force controlling apparatus for a vehicle according to claim 5, wherein the efficiency line is set based on at least one of efficiency of the electric generator, efficiency of an inverter between the electric generator and the motor, and efficiency of the motor.

7. A driving force controlling apparatus for a vehicle including an electric generator and a motor for driving a wheel other than a driving wheel, with electric power from the electric generator, the driving force controlling apparatus comprising:

a requested electric power computing unit that computes requested electric power required for operation of the motor, wherein target output of the electric generator is set based on the requested electric power and maximum output that the electric generator is capable of outputting stably;

wherein output of the electric generator is increased in such a manner as to move on a stable output line obtained from maximum outputs at different internal electromotive voltages of the electric generator, when output of the electric generator is increased to the target output.

* * * * *